US011808612B2

(12) United States Patent
Ueno et al.

(10) Patent No.: US 11,808,612 B2
(45) Date of Patent: Nov. 7, 2023

(54) OPTICAL ROTARY ENCODER, SERVO MOTOR, AND ACTUATOR

(71) Applicant: HARMONIC DRIVE SYSTEMS INC., Tokyo (JP)

(72) Inventors: Shintaro Ueno, Azumino (JP); Yoshinori Shibahara, Azumino (JP); Sadaharu Kanamori, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 381 days.

(21) Appl. No.: 17/298,974

(22) PCT Filed: Mar. 15, 2019

(86) PCT No.: PCT/JP2019/011012
§ 371 (c)(1),
(2) Date: Jun. 2, 2021

(87) PCT Pub. No.: WO2020/188668
PCT Pub. Date: Sep. 24, 2020

(65) Prior Publication Data
US 2022/0065667 A1 Mar. 3, 2022

(51) Int. Cl.
*G01B 11/26* (2006.01)
*G01D 5/347* (2006.01)
*H02K 1/22* (2006.01)

(52) U.S. Cl.
CPC ............ *G01D 5/3473* (2013.01); *H02K 1/22* (2013.01)

(58) Field of Classification Search
CPC ... G01D 5/3473; G01D 5/34707; H02K 11/22
See application file for complete search history.

(56) References Cited

U.S. PATENT DOCUMENTS

2012/0293792 A1* 11/2012 Candiloro ............ G01D 5/3473
356/138
2016/0146640 A1 5/2016 Chen et al.

FOREIGN PATENT DOCUMENTS

| JP | S62187216 A | 8/1987 |
| JP | H01102819 U | 7/1989 |
| JP | H0360020 U | 6/1991 |
| JP | H0552595 A | 3/1993 |
| JP | H08145725 A | 6/1996 |

(Continued)

OTHER PUBLICATIONS

International Search Report (PCT/ISA/210) with translation and Written Opinion (PCT/ISA/237) dated May 14, 2019, by the Japanese Patent Office as the International Searching Authority for International Application No. PCT/JP2019/011012.

*Primary Examiner* — Muhammad S Islam
(74) *Attorney, Agent, or Firm* — BUCHANAN, INGERSOLL & ROONEY PC

(57) ABSTRACT

In this optical rotary encoder, detection tracks of a rotating disc are irradiated with detection light emitted from a light-emitting element. An optical signal obtained via slits in the detection tracks passes through a slit pattern in a fixed slit plate and is received by light-receiving surfaces of a light-receiving element. The slit pattern in the fixed slit plate is formed so as to fit into a range of an effective spot of the detection light. An LED or other light-emitting element that has a small effective spot diameter can be used, which is advantageous in terms of reducing costs and making the device more compact.

6 Claims, 3 Drawing Sheets

(56) References Cited

FOREIGN PATENT DOCUMENTS

| | | | |
|---|---|---|---|
| JP | 2003302258 | A | 10/2003 |
| JP | 2007147396 | A | 6/2007 |
| JP | 2011172358 | A | 9/2011 |
| JP | 2016166879 | A | 9/2016 |
| JP | 2017096711 | A | 6/2017 |

\* cited by examiner (a)

(b)

(c)

OPTICAL ROTARY ENCODER, SERVO MOTOR, AND ACTUATOR

TECHNICAL FIELD

The present invention relates to an optical rotary encoder that is used in order to detect information concerning rotation of a servo motor and information concerning rotation of an output shaft of an actuator configured from a reducer and a motor.

BACKGROUND ART

Transmissive and reflective optical rotary encoders are known as types of optical rotary encoders. As disclosed in Patent Document 1 (FIG. 3), in transmissive optical rotary encoders, a light-emitting element is disposed on one side of a rotating disc attached to a rotating shaft to be measured, and a light-receiving element is disposed on the other side of the rotating disc. Detection light emitted from the light-emitting element passes through a slit pattern formed in the rotating disc and a slit pattern formed in a fixed slit plate, whereby a plurality of optical signals are generated. These optical signals are received by the light-receiving element and photoelectrically converted, after which the signals are supplied to a signal processing circuit and, inter alia, two-phase signals having an A phase and a B phase that have a phase difference of 90° are formed. In the optical rotary encoder disclosed in Patent Document 2, two sets of light-emitting elements and light-receiving elements are provided, and optical signals are generated via two slit patterns formed in a rotating disc and a fixed slit plate. The precision of detection is thereby raised without reducing the size of the slit patterns.

PRIOR-ART DOCUMENTS

Patent Documents

Patent Document 1: JP 2011-172358 A
Patent Document 2: JP 2007-147396 A

SUMMARY OF THE INVENTION

Problems to be Solved by the Invention

In order to raise the detection precision in an optical rotary encoder and also reduce the size and costs of the optical rotary encoder, it is desirable to make it possible to detect a plurality of slit patterns using a single set of a light-emitting element and a light-receiving element. For example, in the optical rotary encoder 100 shown in FIGS. 3(*a*) to 3(*c*), when a light-emitting diode (LED) 101 is used as a light source, the shape of an effective spot of detection light 102 emitted from the LED 101 is round. A plurality of slit patterns 106 (detection tracks) are formed in a rotating disc 103, and a plurality of slit patterns 107 are formed in a fixed slit plate 105 as well.

In FIG. 3(*c*), the empty rectangles indicate slits 103*a* that constitute the plurality of slit patterns 106 in the rotating disc 103, the gray rhombuses indicate slits 105*a* that constitute the slit patterns 107 in the fixed slit plate 105, and the rectangles marked with diagonal lines indicate light-receiving surfaces 104*a* that constitute a light-receiving-surface pattern 108 on a light-receiving element 104. The detection light 102 from the LED 101 passes through the slit patterns 106 in the rotating disc 103 and the slit patterns 107 in the fixed slit plate 105, and then is received by the light-receiving surfaces 104*a* of the light-receiving element 104. As shown in FIG. 3(*c*), an effective spot 109 of the detection light 102 from the LED 101 must be made large enough to encompass the slit patterns in the fixed slit plate 105, which are formed from the plurality of rhomboid slits 105*a*.

For example, when the effective spot 109 of the LED 101 is formed as a small-diameter effective spot 7*a* as shown by virtual lines in FIG. 3(*c*), a pair of slits 105*a* (1), 105*a* (2) within the slit patterns in the fixed slit plate 105 partially jut out beyond the effective spot 7*a*. As a result, the amount of received light of the two-phase optical signals obtained via the pair of slits 105*a* (1), 105*a* (2) decreases, and it is impossible to obtain two-phase signals having a high S/N ratio. It is necessary to select a large-scale LED 101 provided with a large effective spot 109 so that the slits 105*a* that constitute the slit patterns in the fixed slit plate 105 completely fit within the range of the effective spot. If the required effective spot diameter of the LED 101 could be reduced, such a reduction would be advantageous for increasing the degree of freedom in design, reducing costs, and reducing the size of the device.

It is an object of the present invention to provide an optical rotary encoder provided with a fixed slit plate in which is formed a slit pattern that is suitable for being disposed within the range of an effective spot of detection light, the optical rotary encoder being advantageous for improving the degree of freedom in design, reducing costs, and reducing the size.

It is also an object of the present invention to provide a servo motor into which this new optical rotary encoder is incorporated, and an actuator configured from a reducer and a motor into which this new optical rotary encoder is incorporated.

Means of Solving the Problems

In order to solve the abovementioned problems, an optical rotary encoder of the present invention is characterized in being provided with a rotating disc provided with a plurality of detection tracks that are formed concentrically, a light-emitting element that irradiates the detection tracks with detection light, a fixed slit plate provided with a slit pattern that allows passage of optical signals obtained from regions irradiated with the detection light in each of the detection tracks, and a light-receiving element that receives each of the optical signals that have passed through the slit pattern, wherein each of the detection tracks is configured from a slit or a reflective zone, the detection tracks being arranged at regular angular intervals;

the slit pattern in the fixed slit plate is configured from slit rows, the number of slit rows corresponding to the number of detection tracks;

a plurality of first slit rows and a plurality of second slit rows are included among the slit rows, the first and second slit rows being lined up in the radial direction of the rotating disc;

the slit-arrangement-direction length of the first slit rows is shorter than that of the second slit rows; and the slit pattern is formed so that each of the first slit rows is positioned on both radial-direction sides, the radial direction being the direction in which the slit rows are lined up, and the slit pattern being positioned within an effective irradiation region of the detection light in the fixed slit plate.

For example, the first slit rows, which have a small slit-arrangement-direction length, are such that two first slits are arranged at a first interval in the circumferential direction of the rotating disc. However, the second slit rows, which have a large slit-arrangement-direction length, are such that two second slits having the same slit width as the first slits in the first slit rows are arranged at a second interval in the circumferential direction, the second interval being greater than the first interval.

The shape of an effective spot of detection light emitted from an LED or other light-emitting element is typically round. If the number of detection tracks increases, the slit rows of the slit pattern in the fixed slit plate also increase in number, and therefore the size of the light-emitting element in the direction in which the slit rows are lined up increases. In the present invention, the first slit rows, which have a small length, are disposed on both sides in the direction in which the slit rows are lined up. It is possible for the entirety of the slit pattern to be fitted within the range of a smaller effective spot than is the case when the long second slit rows are disposed on both sides in the direction in which the slit rows are lined up. This makes it possible to use an LED or other light-emitting element having a smaller size, and is advantageous for reducing the size of the optical rotary encoder.

MODE FOR CARRYING OUT THE INVENTION

Figure 1:
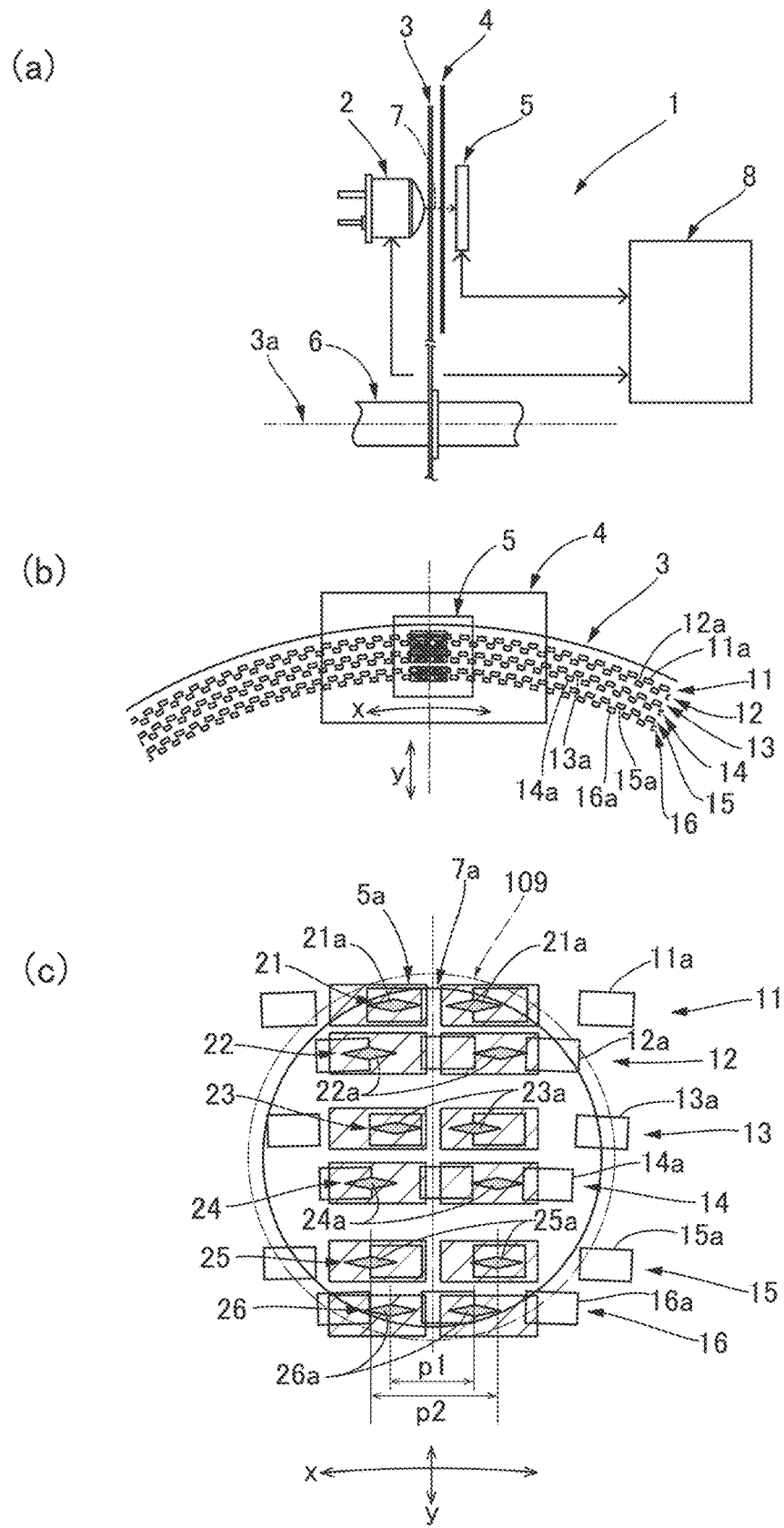
FIG. 1(a) is a schematic diagram showing one example of a transmissive optical rotary encoder to which the present invention is applied.
FIG. 1(b) is a schematic diagram showing detection tracks in a rotating disc, a slit pattern in a fixed slit plate, and a light-receiving-surface pattern on a light-receiving element.
FIG. 1(c) is a schematic diagram showing the detection tracks, the slit pattern, and the light-receiving-surface pattern in an enlarged view together with an effective spot of detection light.

Embodiments of an optical rotary encoder to which the present invention is applied are described below with reference to the accompanying drawings.

FIG. 1(a) is a schematic diagram showing a summarized configuration of a transmissive optical rotary encoder according to the present embodiment. The optical rotary encoder 1 is provided with a light-emitting element 2, a rotating disc 3, a fixed slit plate 4, and a light-receiving element 5. In the present example, an LED is used as the light-emitting element 2. The rotating disc 3 is attached to a rotating shaft 6 to be measured and rotates integrally with the rotating shaft 6. The light-emitting element 2 and the light-receiving element 5 are disposed at fixed positions and face each other, in a direction of the rotational center axis 3a of the rotating disc 3, so as to sandwich the rotating disc 3. The fixed slit plate 4 is disposed between the light-receiving element 5 and the rotating disc 3.

FIG. 1(b) is a schematic diagram showing detection tracks in the rotating disc 3, a slit pattern in the fixed slit plate 4, and a light-receiving-surface pattern on the light-receiving element 5, and FIG. 1(c) is an enlarged view of the same portion. Detection light 7 emitted from the light-emitting element 2 impinges perpendicularly on the rotating disc 3, and the plurality of detection tracks formed in the rotating disc 3 are irradiated with the detection light 7. In the present example, six detection tracks 11-16 are formed concentrically about the rotational center of the rotating disc 3. Two outer-peripheral-side detection tracks 11, 12 are Vernier-scale signal detection tracks in which, e.g., 255 rectangular slits 11a, 12a are formed at regular angular intervals. Two detection tracks 13, 14 on the inner side of the aforementioned detection tracks 11, 12 are main signal detection tracks in which, e.g., 256 rectangular slits 13a, 14a are formed at regular angular intervals. Two rotational-center-side detection tracks 15, 16 are correction signal detection tracks in which, e.g., 240 rectangular slits 15a, 16a having the same shapes (same width and same length) are formed at regular angular intervals. The slits 11a-16a are parts formed in the rotating disc 3 that either fully or partially transmit light.

A slit pattern formed from six slit rows 21-26 is formed in the fixed slit plate 4, correspondingly with respect to the detection tracks 11-16. The slit rows 21-26 are lined up in the radial direction y of the rotating disc 3 (the direction in which the slit rows are lined up). The slit rows 21-26 are respectively configured from a pair of slits 21a, a pair of slits 22a, a pair of slits 23a, a pair of slits 24a, a pair of slits 25a, and a pair of slits 26a, the pairs of slits 21a-26a being disposed at regular intervals in the circumferential direction x of the rotating disc 3 (the direction in which the slits are arranged). The slits 21a-26a are parts that either fully or partially transmit light and that have the same shapes (rhombuses in the present example).

The detection light 7 with which the detection tracks 11-16 are irradiated forms a round effective spot 7a as an effective irradiation region on the surface of the rotating disc 3. The detection light 7 that has passed through the slits 11a-16a in the detection tracks 11-16 positioned within the range of the effective spot 7a becomes optical signals respectively corresponding to the detection tracks 11-16, and the fixed slit plate 4 is irradiated with the optical signals. The optical signals that have passed through the slit pattern in the fixed slit plate 4 are received by light-receiving surfaces 5a of the light-receiving element 5.

In FIG. 1(c), the solid circle indicates the effective spot 7a, the empty rectangles indicate the slits 11a-16a in the six detection tracks 11-16 formed in the rotating disc 3, the gray rhombuses indicate the slits 21a-26a in the six slit rows 21-26 formed in the fixed slit plate 4, and the rectangles marked with diagonal lines indicate the light-receiving surfaces 5a of the light-receiving element 5.

In the fixed slit plate 4, the slits 21a (first slits) in one slit row 21 among the slit rows 21, 22 for generating Vernier-scale signals are arranged at a narrow first angular interval pl in the circumferential direction x (direction in which slits are arranged). An A-phase signal is generated from an optical signal obtained via one slit 21a, and a B-phase signal is generated from an optical signal obtained via the other slit 21a, in association with rotation of the rotating disc 3. The slits 22a (second slits) in the slit row 22 are arranged at a wide second angular interval p2 and are offset from the slits 21a by a prescribed angle in the circumferential direction x (direction in which slits are arranged), whereby an A-phase inverted signal is generated from an optical signal obtained via one slit 22a, and a B-phase inverted signal is generated from an optical signal obtained via the other slit 22a.

The slit rows 23, 24 for generating main signals are also configured in a similar manner. The slits 23a (first slits) in the slit row 23 are arranged at the first angular interval p1, and two-phase signals having an A phase and a B phase are generated. The slits 24a (second slits) in the slit row 24 are arranged at the second angular interval p2, and an A-phase inverted signal and a B-phase inverted signal are generated.

However, in the slit rows 25, 26 for generating correction signals, the slits 25a (second slits) in the slit row 25, which is positioned on the outer side in the radial direction y, are arranged at the wide second angular interval p2 in the circumferential direction x. The slits 26a (first slits) in the other slit row 26 are arranged at the narrow first angular interval p1 in the circumferential direction x. As described below, inter alia, the wiring on the light-receiving-element 5 side is changed so as to adopt a configuration in which two-phase signals having an A phase and a B phase are generated from an optical signal obtained from the slits 25a in the slit row 25, and in which an A-phase inverted signal and a B-phase inverted signal are obtained from an optical signal obtained from the slits 26a in the slit row 26.

A light-receiving-surface pattern on the light-receiving element 5 includes twelve light-receiving surfaces 5a, correspondingly with respect to the slits 21a-26a. Optical signals received by the light-receiving surfaces 5a are converted to electrical signals and are then supplied to a signal processing unit 8. In the signal processing unit 8, a main signal formed from two sets of two-phase signals, a Vernier-scale signal formed from two sets of two-phase signals, and a correction signal formed from two sets of two-phase signals are generated through well-known signal processing.

Figure 3:
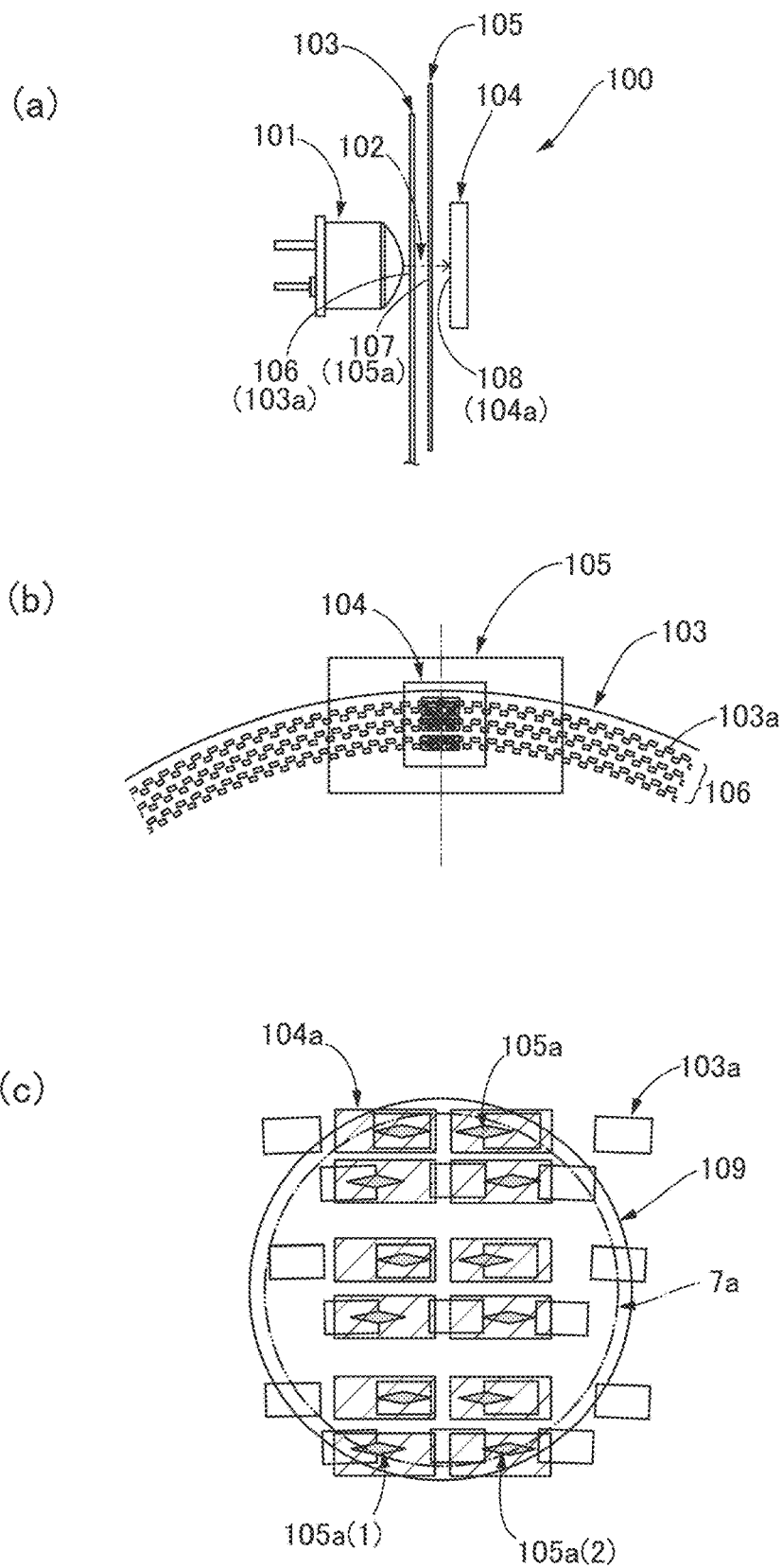
FIG. 3(a) is a schematic diagram showing one example of a transmissive optical rotary encoder.
FIG. 3(b) is a schematic diagram showing detection tracks in a rotating disc, slit patterns in a fixed slit plate, and a light-receiving-surface pattern on a light-receiving element.
FIG. 3(c) is a schematic diagram showing the detection tracks, the slit patterns, and the light-receiving-surface pattern in an enlarged view together with an effective spot of detection light.

In the slit pattern in the fixed slit plate 4 of the optical rotary encoder 1 in the present example, the pair of slits 21a and the pair of slits 26a in the slit rows 21, 26 that are respectively positioned at the outer end and the inner end in the radial direction y (direction in which slit rows are lined up) are each arranged at the narrow first angular interval p1. All of the slits 21a, 26a thereby fit within the range of the round effective spot 7a of the detection light 7. In the case of the slit patterns in the fixed slit plate 105 shown in FIG. 3(c), it is necessary to use an LED 101 that has an effective spot 109 having a larger diameter than the effective spot 7a so as to fit the slit patterns within the range of the effective spot. In the present example, it is possible to use a light-emitting element 2 having a smaller effective spot diameter.

In the present example, the slit patterns in the slit rows 25, 26 in the fixed slit plate 4 are reversed with respect to those in the slit rows 21, 22 and in the slit rows 23, 24. The slit rows are designed so that two-phase signals having an A phase and a B phase are generated from the slits having the narrow first angular interval p1, and so that inverted signals of these two-phase signals are generated from the slits having the wide second angular interval p2. In this case, the wiring should be changed so that the output from the light-receiving surfaces 5a that receive optical signals obtained via the slits 25a disposed at the wide second angular interval p2 and the output from the light-receiving surfaces 5a that receive optical signals obtained via the slits 26a disposed at the narrow first angular interval p1 are switched and then supplied to the signal processing unit 8. Alternatively, if the light-receiving element is programmable, it is permissible to change only internal resistors (allocation of signals) without changing the signal wiring. Thus, it is easy to change the slit pattern in the fixed slit plate 4 and to fit the slits 21a-26a within the range of the effective spot 7a without changing the detection tracks 11-16 in the rotating disc 3, the light-receiving-surface pattern in the light-receiving element 5, etc.

Figure 2:
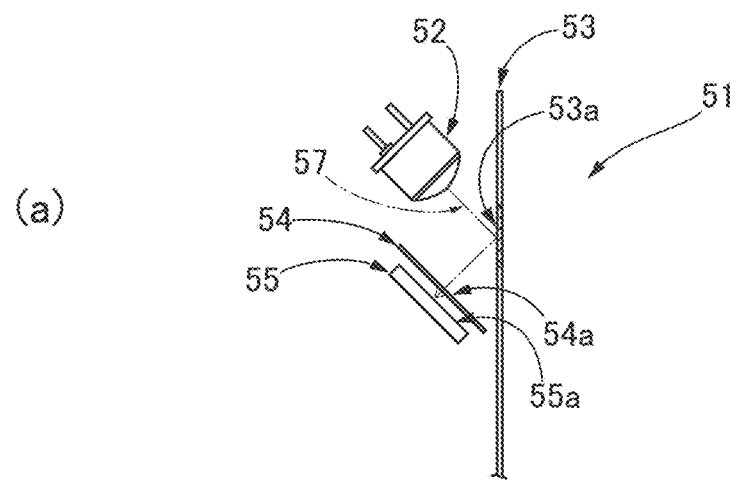
FIG. 2(a) is a schematic diagram showing an example of the configuration of a reflective optical rotary encoder to which the present invention can be applied.
FIG. 2(b) is a schematic diagram showing a servo motor into which the optical rotary encoder of the present invention is incorporated.
FIG. 2(c) is a schematic diagram showing an actuator into which the optical rotary encoder of the present invention is incorporated.
Figure 2:
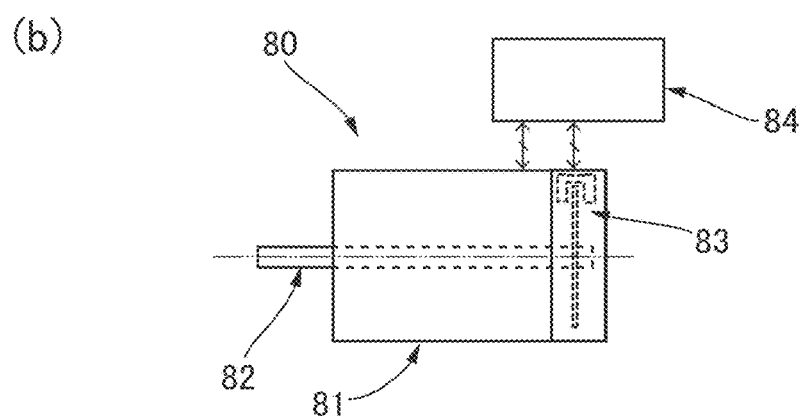
Figure 2:
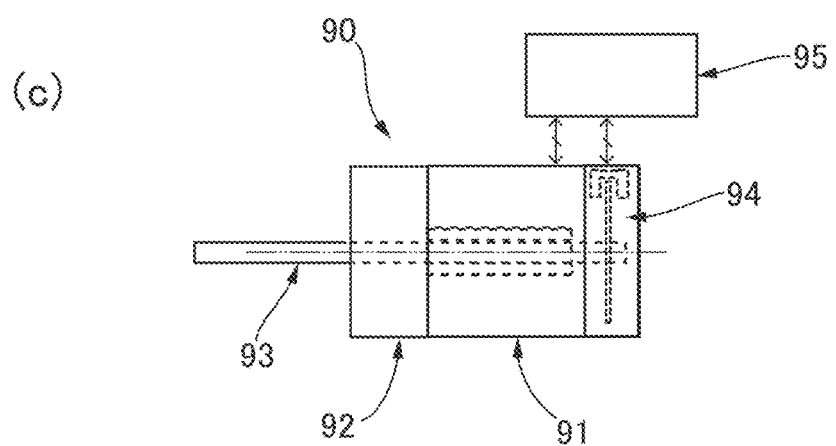

The present invention can moreover be applied in a similar manner to a reflective optical rotary encoder. FIG. 2(a) shows a summarized configuration of a reflective optical rotary encoder. The basic configuration of the optical rotary encoder 51 is the same as that of a typical reflective optical rotary encoder. The optical rotary encoder 51 is provided with a light-emitting element 52, a rotating disc 53, a fixed mask 54, and a light-receiving element 55. The rotating disc 53 is attached to a rotating shaft to be measured (not shown) and rotates integrally with the rotating shaft. The light-emitting element 52 and the light-receiving element 55 are disposed at fixed positions and are disposed on the same side with respect to the rotating disc 53. Detection light 57 emitted from the light-emitting element 52 is reflected by detection tracks 53a in the surface of the rotating disc 53, the detection tracks 53a being formed from reflective zones that are arranged concentrically, and the reflected detection light 57 is received by light-receiving surfaces 55a of the light-receiving element 55 via a slit pattern 54a formed in the fixed mask 54. The slit pattern formed in the fixed mask 54 is formed so that the slits fit within the range of an effective spot of the detection light reflected by the detection tracks 53a.

FIG. 2(b) is a schematic diagram showing a servo motor to which the present invention is applied. The servo motor 80 is provided with: a motor body part 81; an encoder 83 for detecting rotation information such as the rotation position and the rotation speed of a motor output shaft 82; and a motor control unit 84. The optical rotary encoder 1, 51 shown in FIG. 1 or FIG. 2(a) is used as the encoder 83.

FIG. 2(c) is a schematic diagram showing one example of an actuator to which the present invention is applied. The actuator 90 is provided with: a motor 91; a reducer 92 that reduces the speed of the output rotation of the motor 91 and then outputs said reduced-speed rotation; an encoder 94 that detects rotation information such as the rotation position and the rotation speed of an output shaft 93 of the reducer 92; and a control unit 95. The optical rotary encoder 1, 51 shown in FIG. 1 or FIG. 2(a) is used as the encoder 94.

Other Embodiments

There are cases where the slit patterns in the optical rotary encoder described above are formed through a Vernier-scale scheme. The present invention can be applied in a similar manner to an incremental-scheme optical rotary encoder provided with a plurality of slit rows having different numbers of slits, or to an optical rotary encoder in which a plurality of slit rows are formed in accordance with an M-serial arrangement pattern.

In such cases, in the plurality of slit rows formed in the fixed slit plate of the optical rotary encoder, the slit widths may be the same or different, the slit intervals may be the same or different, and the numbers of slits may be the same or different. In all of these cases, the slit rows having a relatively larger slit-arrangement-direction length are disposed on the center side in the direction in which the slit rows are lined up, and the slit rows having a relatively smaller slit-arrangement-direction length are disposed on both sides in the direction in which the slit rows are lined up. This facilitates fitting of all of the slit rows within the range of a smaller effective spot diameter.

The invention claimed is:

1. An optical rotary encoder comprising:
a rotating disc provided with a plurality of detection tracks that are formed concentrically;
a light-emitting element that irradiates the detection tracks with detection light;
a fixed slit plate provided with a slit pattern that allows passage of optical signals obtained from regions irradiated with the detection light in each of the detection tracks; and
a light-receiving element that receives each of the optical signals that have passed through the slit pattern,
wherein each of the detection tracks is configured from a slit or a reflective zone arranged at regular angular intervals;
the slit pattern in the fixed slit plate is configured from slit rows, the number of slit rows corresponding to the number of detection tracks;
the slit rows includes a plurality of first slit rows and a plurality of second slit rows, the first and second slit rows being lined up in the radial direction of the rotating disc;
the first slit rows have a slit-arrangement-direction length that is shorter than that of the second slit rows; and
the slit pattern is formed so that each of the first slit rows is positioned on both radial-direction sides, the radial direction being a direction in which the slit rows are lined up, and the slit pattern being positioned within an effective irradiation region of the detection light in the fixed slit plate.

2. The optical rotary encoder according to claim 1, wherein each of the first slit rows has two first slits that are arranged at a first interval in a circumferential direction of the rotating disc; and
each of the second slit rows has two second slits that has a same slit width as the first slits of the first slit rows and are arranged at second interval in the circumferential direction, the second interval being greater than the first interval.

3. The optical rotary encoder according to claim 2, wherein each of the detection tracks is provided with slits that are arranged at a constant angular interval in the circumferential direction and allows the detection light to pass therethrough; and
the light-receiving element is provided with a plurality of light-receiving surfaces that receive plural sets of two-phase light signals, two-phase light signals being obtained from the detection light that has passed through the slits of the detection tracks and the slit patters in the fixed slit plate.

4. The optical rotary encoder according to claim 3, wherein the rotating disc is provided with six of the detection tracks arranged therein;
the slit patterns of the fixed slit plate are configured to have three of the first slit rows and three of the second slit rows; and
the light-receiving element is provided with twelve of the light-receiving surfaces to receive six sets of the two-phase light signals.

5. A servo motor comprising:
the optical rotary encoder as set forth in claim 1 to detect rotation information of a motor output shaft.

6. An actuator comprising:
a motor;
a reducer to reduce speed of output rotation of the motor; and
the optical rotary encoder as set forth in claim 1 to detect rotation information of an output shaft of the reducer.

* * * * *